United States Patent
Vadala

(10) Patent No.: US 8,661,699 B2
(45) Date of Patent: Mar. 4, 2014

(54) SQUARING TOOL WITH OFFSET BLADES

(76) Inventor: John Vadala, Syracuse, NY (US)

( * ) Notice: Subject to any disclaimer, the term of this patent is extended or adjusted under 35 U.S.C. 154(b) by 196 days.

(21) Appl. No.: 13/292,464

(22) Filed: Nov. 9, 2011

(65) Prior Publication Data
US 2013/0111772 A1 May 9, 2013

(51) Int. Cl.
*B43L 7/027* (2006.01)

(52) U.S. Cl.
USPC .............................. 33/481; 33/32.2

(58) Field of Classification Search
USPC ......... 33/32.1, 32.2, 415, 418, 427, 429, 474, 33/481, 483
See application file for complete search history.

(56) References Cited

U.S. PATENT DOCUMENTS

| | | | |
|---|---|---|---|
| 74,297 A * | 2/1868 | Burnett | 33/415 |
| 914,211 A | 3/1909 | Whaley | |
| 921,488 A | 5/1909 | Virtue | |
| 1,048,333 A | 12/1912 | Mishler | |
| 1,553,229 A * | 9/1925 | Frasier | 33/474 |
| 2,461,783 A | 2/1949 | Stark | |
| 3,303,569 A * | 2/1967 | Wyatt | 33/343 |
| D215,757 S | 10/1969 | Chang | |
| 4,138,819 A | 2/1979 | Sosin | |
| 4,553,327 A * | 11/1985 | Watanabe | 33/32.2 |
| 5,070,562 A | 12/1991 | Lentino | |
| D335,090 S | 4/1993 | Guillen | |
| 6,272,758 B1 * | 8/2001 | Wheeler | 33/474 |
| 6,629,372 B2 | 10/2003 | Doyle | |
| 7,591,076 B2 * | 9/2009 | Varnedoe | 33/481 |
| 2008/0301962 A1 * | 12/2008 | Haala | 33/415 |

* cited by examiner

*Primary Examiner* — G. Bradley Bennett
(74) *Attorney, Agent, or Firm* — Bernhard P. Molldrem, Jr.

(57) ABSTRACT

A framing tool, namely framing square, is provided with an offset at the proximal ends of the two blades, so that the blades lie in parallel planes. This tool facilitates measuring and marking tubular beams, i.e., beams of generally square or rectangular cross section, but which may have rounded or radiused edges.

7 Claims, 2 Drawing Sheets

SQUARING TOOL WITH OFFSET BLADES

FIELD OF THE INVENTION

The present invention relates generally to hand tools that can be used in fabrication of structures from metal tubes and beams, and is more particularly directed to a framing tool, namely a squaring tool, that can be easily used for measuring and marking tubular beams, i.e., beams of generally square or rectangular cross section, but which may have rounded or radiused edges.

BACKGROUND OF THE INVENTION

Steel beams are widely employed in the construction of many types of structures, and in particular tube beams, i.e., rectangular section pipes, are employed in many situations. These tube beams need to be cut and welded in the construction process.

Steel beams, including tube beams, need to be measured and scored or marked for cutting and welding. A problem arises from the presence of the radiused corners or edges of the pipe. Typically, the welder working with this type of pipe has to use a squaring tool to measure the places along the pipe where a cut or weld is to be positioned. However, a standard, i.e., flat framing square, is difficult to use at the front or open edge of the tube beam, partly owing to the curved corners of the beam. It is difficult or impossible to place the second arm or blade of a flat framing square against a flat side of the tube beam when measuring and marking the front edge of another flat side of the tube beam, and typically the welder will have to tilt the tool to attempt to position the second blade against the side of the tube beam. However, this can lead to inaccuracies in marking the beam.

It is this difficulty to which the present invention is addressed.

OBJECTS AND SUMMARY OF THE INVENTION

Accordingly, is an object of the present invention to provide a framing tool that can be used with tubular beams and which overcomes the drawbacks of the prior art.

It is a further object of the present invention to provide a framing tool of a straightforward design which is simple for the welder or other workman to use.

It is another object to provide a tool which can be employed in a number of different applications for speedy and accurate framing and marking of workpieces.

In accordance with an aspect of this invention a squaring tool is provided in which there are two blades directed at ninety degrees from one another, but there is an offset at the proximal ends where the blades are connected. This permits one blade to be positioned at the front edge of a top side or flange of the tube beam, with the other blade placed directly against a web or side wall of the beam but at a position a short distance away from the edge. The framing square is thus positioned square to the beam, and can be used for quickly and accurately marking a position on the top flange (or any other side of the beam), both at the edge and at other positions along the beam.

More specifically, a squaring tool is adapted for measuring exterior planar surfaces of a workpiece wherein said exterior planar surfaces are at substantially a right angle to one another and meet at a rounded or radiused edge. A first planar blade of the tool extends in a first direction in a first plane from a proximal end to a distal end of the blade, and has inside and outside parallel edges extend in that first direction. A second planar blade extends in a second direction, perpendicular to said first direction. The second blade is located in a second plane that is parallel to the first plane (the plane of the first blade) but offset from it by a predetermined offset distance. The second blade also has inside and outside parallel edges that extend in the second direction. An offset member joins the proximal end of the first blade with the proximal end of the second blade. This framing tool is constructed with inside edges of the first and second blades being free of any protuberance or obstruction. Consequently, each of said inside edges can lie flat against a respective exterior planar surface of the workpiece, and the blades themselves can also lay flat against a flat surface of the workpiece.

In preferred embodiments, the offset member extends at a first predetermined angle from the proximal end of the first blade and is joined to the proximal end of said second blade at a second angle complementary to said first angle, such that the two blades lie in parallel planes. The first and second angles may both be substantially 90 degrees, or the first and second angles may be substantially 45 and 135 degrees, respectively. each of said blades has gradations at predetermined intervals along the inside edges thereof.

Favorably, the offset member connects to the inside edge of said first blade at the proximal end thereof, and to a proximal edge of the second blade.

Each of the blades may have gradations at predetermined intervals along the inside edges thereof, or preferably on both the inside and outside edges. These may be in inch-based intervals or centimeter based intervals, or both.

The framing tool may be formed unitarily of steel, although an aluminum alloy, a tough plastic, or another sturdy material may be used for it, as appropriate.

The above and many other objects, features, and advantages of the invention will become apparent from the accompanying Drawing figures, which are to be considered in connection with the following description.

DETAILED DESCRIPTION OF THE PREFERRED EMBODIMENTS

Figure 1:
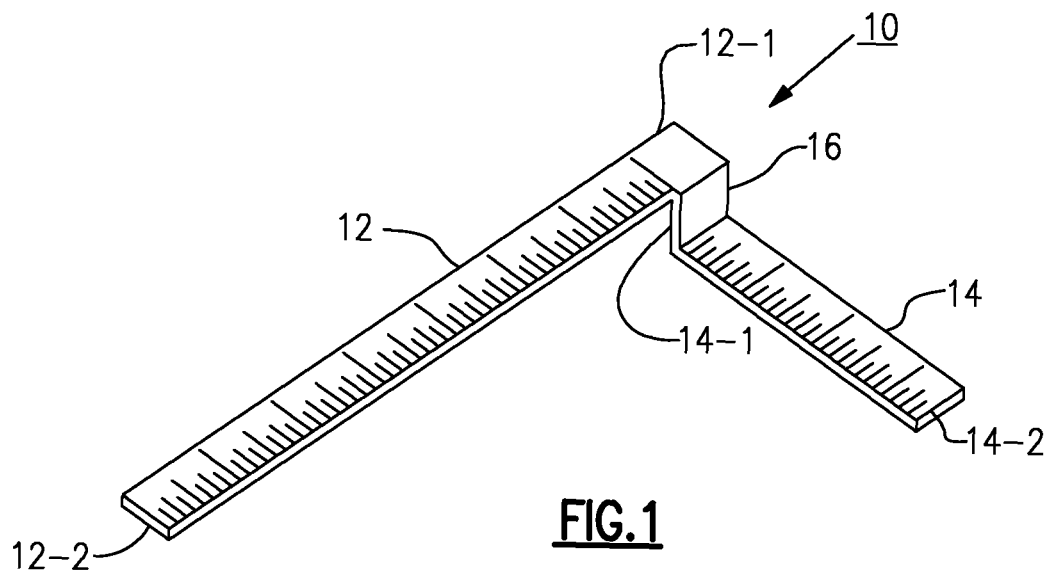
FIG. 1 is a perspective view of a framing square according to an embodiment of this invention.
Figure 2:
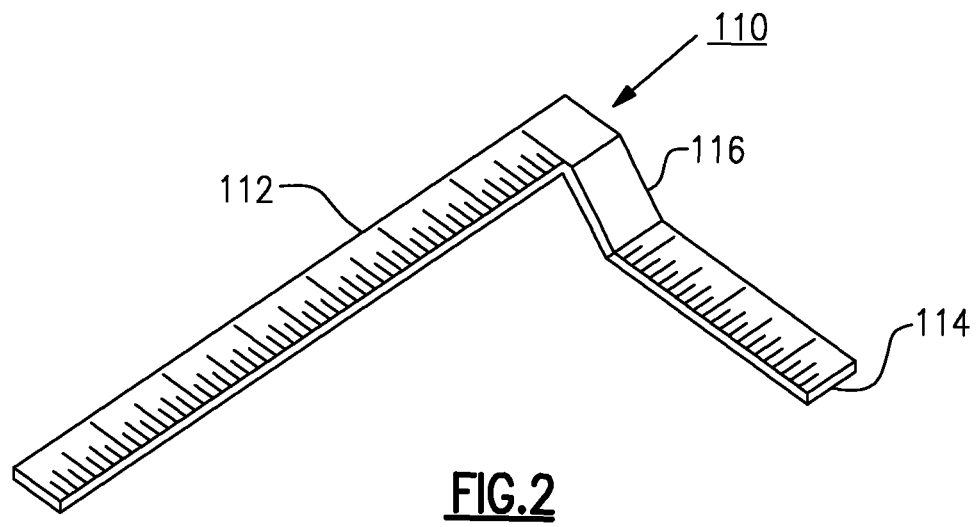
FIG. 2 is another perspective view illustrating an alternative embodiment of the present invention.
Figure 3:
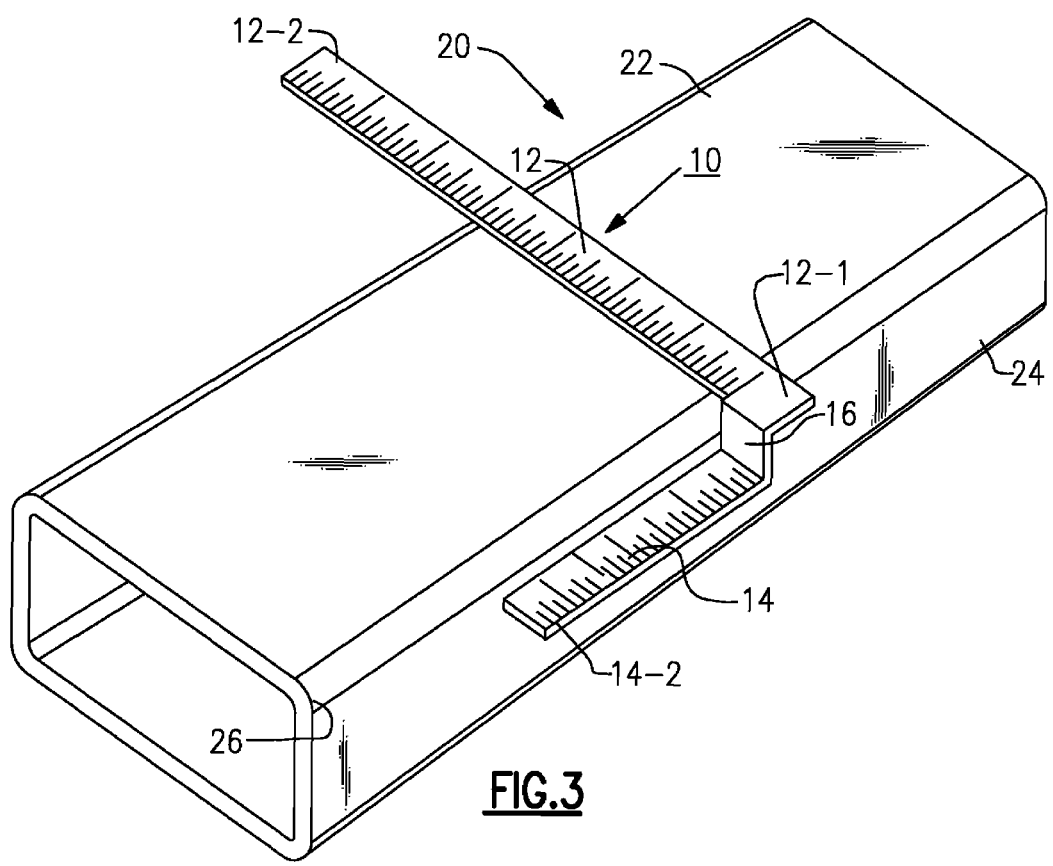
FIG. 3 is perspective view illustrating the use of the tool of the present invention with a tubular beam.

With reference to FIGS. 1 to 3 of the Drawing, and initially to FIG. 1, there is shown a framing square 10 there formed of a first blade 12 and a second blade 14 that extend at right angles from one another. Each of the blades 12 and 14 has two parallel edges, and has a proximal end (12-1 and 14-1, respectively) at the corner formed by the two blades, and each has a proximal or free end (12-2 and 14-2, respectively). The two blades 14 and 16 lie in parallel planes that are spaced apart from one another. An offset 16 joins the proximal ends of the two blades, and here the offset 16 meets the side of the first blade proximal end 12-1 at ninety degrees and also joins the end of the second blade proximal end 14-1 at ninety degrees. The offset 16 extends about one to two inches, although the exact length of the offset is not critical.

FIG. 2 shows a second embodiment in which the framing square 110 has a first blade 112 and a second blade 114 that extend out in directions that are at right angles to one another, and the blades 112 and 114 lie in parallel planes that spaced an offset amount from one another. Here an offset 116 joins the proximal ends of the two blades, but at angles of forty-five degrees and one-hundred thirty-five degrees, i.e., bent down 45 degrees and then bent up 45 degrees. In other embodiments, the offset can be angled at any two angles that are complementary to one another, and will result in the two blades lying parallel to one another.

In each embodiment, the blades have markings or gradations spaced along at least the inside edge, and favorably on both edges and both sides of the blades. These can be in intervals of inches and fractions of an inch, or in International units (centimeters and millimeters). Most favorably, the framing square 10 or 110 is formed of a single piece of steel sheet, but can be formed of another suitable material, e.g., a sturdy aluminum alloy or any of a variety of modern synthetic plastic resins.

The method of employing the squaring tool of this invention is illustrated in FIG. 3. In this application, the framing tool 10 is used for measuring and marking a steel tubular beam 20, in which adjacent web or flange surfaces 22 and 24 are flat and at right angles to one another, but are joined at a rounded or radiused edge 26. In this application, the first blade 12 can be laid along the beam 20 on web surface 22, and the second blade 14 is a short distance below that with its edge along flange surface 24. The flat of the blade 12 and the edge of the blade 14 are placed flush against the respective surfaces 22 and 24, and with the blade 12 square to the beam axis. This allows the beam to be marked accurately, using the blade or blades as a guide, to mark the workpiece for cutting or welding at specific locations along the web surface from the front edge to similar locations along the beam and spaced back from the front edge, along the web surface 22. The tool 10 can be held square to the beam because the end 12-1 of the first blade and the offset 12 joining to the proximal end 14-1 of second blade 14 bridge around the curved or radiused edge 26, by virtue of the offset 16. This is not possible with a standard, single-plane framing square. The offset 16 or 116 avoids having to lie the tool onto the rounded or radiused edge 26. The second blade 14 or 114 is placed axially along the beam 20, i.e., parallel the web surface 22 and also parallel to the edge 26, and does not have to be angled back on the tubular beam.

Also the inside edges of the two blades are flat and straight, and free of any protuberances or obstructions, so that they can both contact the flat surfaces of the tubular beam 20 flush against the respective surface of the beam.

In the illustrated embodiments, the shorter, second blade 14 or 114 is shown offset from the right-hand side of the first blade 12 or 112, but the tool could be fabricated with the second blade offset from the left-hand side of the first blade.

This framing tool may also be employed favorably when working with other beam types that have a flange and web joined at a rounded edge, e.g., an L-profile beam or a C-profile channel beam.

Many modifications and variations are possible, in addition to the above-described preferred embodiments of the invention, without departing from the scope and spirit of the present invention, as defined in the appended claims.

I claim:

1. A squaring tool for measuring exterior planar surfaces of a workpiece wherein said exterior planar surfaces are at substantially a right angle to one another and meet at a rounded edge; said tool comprising:
    a) a first planar blade that extends in a first direction in a first plane from a proximal end thereof to a distal end thereof, and having inside and outside parallel edges that extend in said first direction;
    b) a second planar blade that extends in a second direction, perpendicular to said first direction, along a second plane that is parallel to said first plane but offset therefrom a predetermined offset distance, and having inside and outside parallel edges therealong that extend in said second direction; and
    c) an offset member joining the proximal end of said first blade with the proximal end of said second blade;
    d) wherein said inside edges of said first and second blades are free of any protuberance or obstruction such that each of said inside edges can lie against a respective exterior planar surface of said workpiece.

2. The squaring tool according to claim 1 wherein said offset member extends at a first predetermined angle from the proximal end of said first blade and is joined to the proximal end of said second blade at a second angle complementary to said first angle.

3. The squaring tool according to claim 2 wherein said first and second angles are both substantially 90 degrees.

4. The squaring tool according to claim 2 wherein said first and second angles are substantially 45 and 135 degrees, respectively.

5. The squaring tool according to claim 1 wherein each of said blades has gradations at predetermined intervals along the inside edges thereof.

6. The squaring tool according to claim 1 wherein said offset connects to the inside edge of said first blade at the proximal end thereof, and to a proximal edge of said second blade.

7. A method of marking a flat surface of a tubular beam of the type having at least first and second surfaces that lie in planes that are at a right angle to one another and which meet at a radiused rounded edge; the method comprising:
    placing on the beam a squaring tool that includes first and second planar blades that extend in respective first and second directions perpendicular to one another, from proximal to distal ends thereof, and each blade having inside and outside parallel edges that extend in the associated first and second directions, the blades lying in first and second planes that are parallel to but offset from one another, and in which an offset member joins the proximal ends of the first and second blades, and wherein the inside edges of the blades are free of any protuberance or obstruction, said step of placing including causing said blades to lie flush upon said first and second surfaces, respectively, of said tubular beam; and
    marking one of said first and second surfaces, employing the respective one of said first and second blades as a guide.

* * * * *